(12) United States Patent
Kato

(10) Patent No.: US 11,182,949 B2
(45) Date of Patent: Nov. 23, 2021

(54) PACK TILE

(71) Applicant: DREAMWORKS ANIMATION LLC, Glendale, CA (US)

(72) Inventor: Toshiaki Kato, Irvine, CA (US)

(73) Assignee: DreamWorks Animation LLC, Glendale, CA (US)

( * ) Notice: Subject to any disclaimer, the term of this patent is extended or adjusted under 35 U.S.C. 154(b) by 0 days.

(21) Appl. No.: 16/786,899

(22) Filed: Feb. 10, 2020

(65) Prior Publication Data

US 2021/0027521 A1   Jan. 28, 2021

Related U.S. Application Data

(60) Provisional application No. 62/878,665, filed on Jul. 25, 2019.

(51) Int. Cl.
*G06T 15/10* (2011.01)
*G06T 13/20* (2011.01)
*G06T 15/00* (2011.01)

(52) U.S. Cl.
CPC .............. *G06T 15/10* (2013.01); *G06T 13/20* (2013.01); *G06T 15/005* (2013.01)

(58) Field of Classification Search
CPC ........ G06T 15/10; G06T 13/20; G06T 15/005
See application file for complete search history.

(56) References Cited

U.S. PATENT DOCUMENTS

| 2009/0100125 A1* | 4/2009 | McDowell | G06F 16/9574 709/203 |
| 2018/0089791 A1* | 3/2018 | Greenwood | G01C 21/32 |
| 2018/0300932 A1* | 10/2018 | Kuwahara | G06T 15/005 |

OTHER PUBLICATIONS

Hal Bertram, "Production Rendering Acceleration Techniques", Jul. 30, 2006, ACM SIGGRAPH 2006 Courses (SIGGRAPH '06). Association for Computing Machinery, New York, NY, USA, 9-es. (Year: 2006).*

* cited by examiner

*Primary Examiner* — Chong Wu
(74) *Attorney, Agent, or Firm* — Lee, Hong, Degerman, Kang & Waimey

(57) ABSTRACT

A method of facilitating an interactive rendering of a computer image at a remote computer includes: at a first time, obtaining first information of the image, including pixel information of the image at the first time; and, at a second time after the first time, obtaining second information of the image including pixel information of the image at the second time. Delta pixel information is generated by comparing the pixel information of the first information with the pixel information of the second information, to include one or more portions of the pixel information of the second information updated since the first information was obtained, and to exclude one or more portions of the pixel information of the second information unchanged since the first information was obtained. The method further includes: transmitting the delta pixel information in a lossless format to a front-end client to enable reconstruction of the second information.

22 Claims, 7 Drawing Sheets

PACK TILE

CROSS-REFERENCE TO RELATED APPLICATION(S)

Pursuant to 35 U.S.C. § 119(e), this application claims the benefit of U.S. Provisional Patent Application No. 62/878,665, filed on Jul. 25, 2019, the contents of which are hereby incorporated by reference herein in its entirety.

BACKGROUND

A computer-generated animation is typically created by rendering a sequence of images, with each image depicting a computer-generated scene composed of one or more computer-generated assets (e.g., a character, a group of characters, an environment, an effect, or a lighting rig). During an interactive session for rendering a scene, an artist may use one or more tools to change aspects or conditions of the scene. For example, a lighting artist may use a lighting tool to change conditions of the scene. According to the changes initiated by the artist, each of one or more rendering engines may render an image depicting the scene and send intermediate snapshots of the rendering results to a front-end client. These intermediate snapshots may be sent at particular time intervals. The front-end client controls a display of the snapshots, e.g., at a monitor. The artist may then evaluate progressive results of the changes that he or she had initiated, as the scene is rendered.

Rendering a computer graphics image at high resolution and complexity may be computationally expensive. For example, an artist may view such images at a front-end client (e.g., computer workstation). If computational work for rendering the images is performed only at the computer workstation being used by the artist, the speed of rendering is limited by the computation power of that workstation. To improve computational speed relating to rendering images, one or more back-end rendering engines (e.g., back-end farm computers) may be employed in the rendering process. In this situation, results of rendering an image are sent to the front-end client, e.g., over a communication interface. This may accelerate the presentation of rendered images at the front-end client, so that the artist is able to view, more quickly, results of changes he or she had initiated.

SUMMARY

Aspects of the present disclosure are directed to control communication between one or more back-end rendering engines and a front-end client, e.g., to reduce data transfer size and/or latency. According to one or more embodiments, data is communicated to the front-end client without using lossy data compression. This increases a likelihood that a precision of a computer image, as reconstructed at the front-end client, matches that of a computer image, as rendered based on processing performed by the back-end rendering engine(s). According to one or more embodiments, a frame buffer, as reconstructed at the front-end client, may be guaranteed to match a frame buffer, as updated by the back-end rendering engine(s).

For example, aspects of this disclosure are directed to achieving a lossless data transfer based on a reduced (e.g., minimal) quantity of data that is transmitted and/or a reduced (e.g., minimal) latency. Although features of embodiments of the present invention may be described, for purposes of illustration, within the context of an interactive lighting session in a computer animation environment, it is understood that described features are by no means limited to this context and may be applied in other contexts within the computer arts.

According to at least one embodiment, a method of facilitating an interactive rendering of a computer image at a remote computer includes: at a first time, obtaining first information of the computer image, the first information comprising pixel information of the computer image at the first time; and, at a second time after the first time, obtaining second information of the computer image, the second information comprising pixel information of the computer image at the second time. The method further includes: generating delta pixel information by comparing the pixel information of the first information with the pixel information of the second information. The delta pixel information is generated to include one or more portions of the pixel information of the second information that are updated since the first information was obtained. The delta pixel information is generated to exclude one or more portions of the pixel information of the second information that are unchanged since the first information was obtained. The method further includes: transmitting the delta pixel information in a lossless format to a front-end client to enable reconstruction of the second information of the computer image at the front-end client.

According to at least one embodiment, a machine-readable non-transitory medium storing machine-executable instructions for facilitating an interactive rendering of a computer image at a remote computer is disclosed. The instructions include: at a first time, obtaining first information of the computer image, the first information comprising pixel information of the computer image at the first time; and, at a second time after the first time, obtaining second information of the computer image, the second information comprising pixel information of the computer image at the second time. The instructions further include: generating delta pixel information by comparing the pixel information of the first information with the pixel information of the second information. The delta pixel information is generated to include one or more portions of the pixel information of the second information that are updated since the first information was obtained, and the delta pixel information is generated to exclude one or more portions of the pixel information of the second information that are unchanged since the first information was obtained. The instructions further include: transmitting the delta pixel information in a lossless format to a front-end client to enable reconstruction of the second information of the computer image at the front-end client.

According to at least one embodiment, a system for facilitating an interactive rendering of a computer image at a remote computer is disclosed. The system includes one or more controllers configured to: at a first time, obtain first information of the computer image, the first information comprising pixel information of the computer image at the first time; at a second time after the first time, obtain second information of the computer image, the second information comprising pixel information of the computer image at the second time; and generate delta pixel information by comparing the pixel information of the first information with the pixel information of the second information. The delta pixel information is generated to include one or more portions of the pixel information of the second information that are updated since the first information was obtained, and the delta pixel information is generated to exclude one or more portions of the pixel information of the second information that are unchanged since the first information was obtained.

The one or more controllers are further configured to: transmit the delta pixel information in a lossless format to a front-end client to enable reconstruction of the second information of the computer image at the front-end client.

According to at least one embodiment, a method of facilitating an interactive rendering of a computer image at a front-end computer includes: retrieving first information of the computer image, the first information comprising pixel information of the computer image at a first time; and receiving, in a lossless format, delta pixel information. The delta pixel information includes one or more portions of pixel information of second information of the computer image at a second time after the first time, the one or more portions of the second information being updated relative to the first information. The delta pixel information excludes one or more portions of the pixel information of the second information that are unchanged relative to the first information. The method further includes reconstructing the second information by updating the retrieved first information based on the received delta pixel information.

BRIEF DESCRIPTION OF THE DRAWINGS

The above and other aspects and features of the present disclosure will become more apparent upon consideration of the following description of embodiments, taken in conjunction with the accompanying figures.

DETAILED DESCRIPTION

In the following detailed description, reference is made to the accompanying figures which form a part hereof, and which show by way of illustration specific embodiments of the present invention. It is to be understood by those of ordinary skill in the technological field of computer animation and other computer modeling applications that other embodiments may be utilized, and that structural, electrical, as well as procedural changes may be made without departing from the scope of the present invention. Wherever possible, the same reference numbers will be used throughout the drawings to refer to the same or similar parts.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown but is to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

Figure 1:
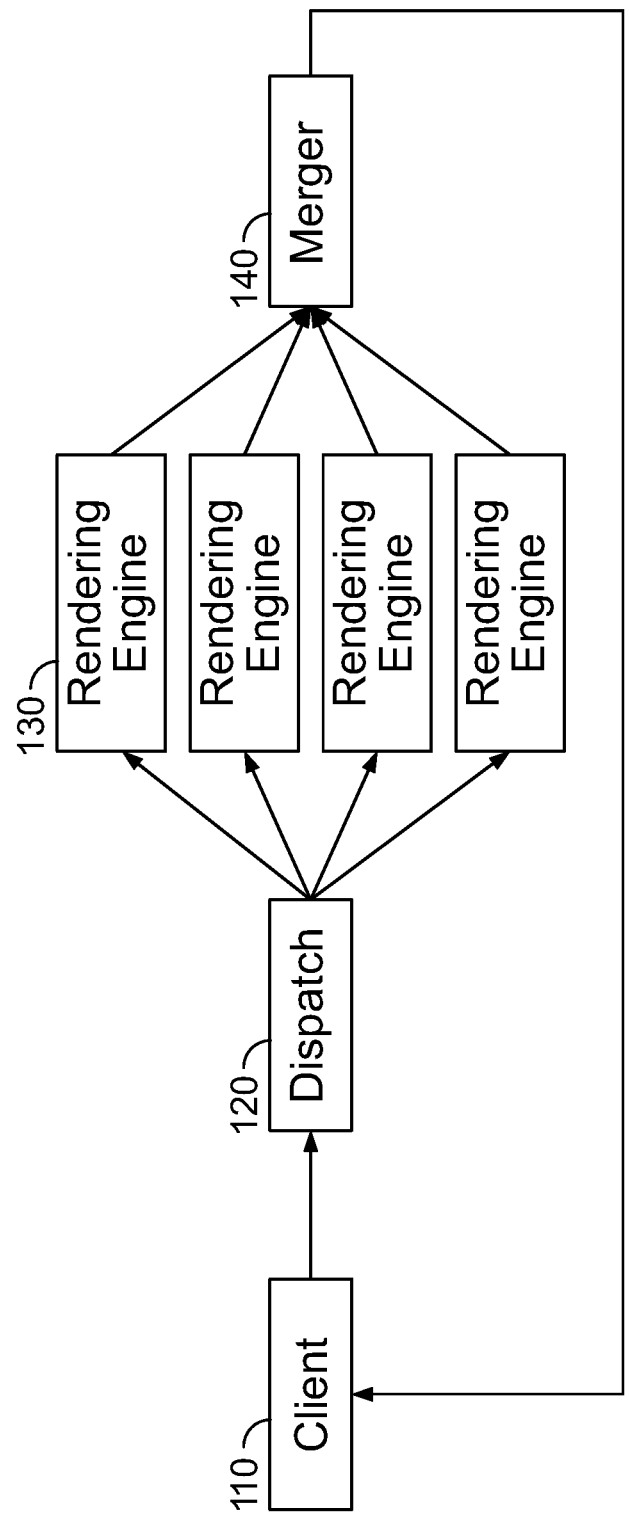
FIG. 1 is a block diagram illustrating operation by a plurality of rendering processes according to least one embodiment.

With reference to FIG. 1, during an interactive rendering session, a client (e.g., front-end client 110) provides inputs to a dispatch 120. The inputs may include, e.g., changes initiated by an artist. For example, the changes may be provided during the session, which may be an interactive lighting session. The dispatch 120 provides the inputs to each of a plurality of rendering engines 130. The rendering engines 130 may reside on one or more hosts that are separate from the front-end client 110. For example, the rendering engines 130 may all reside on different hosts (e.g., different remote computers). The inputs are collectively processed by the rendering engines 130.

Each of the rendering engines 130 generates results. For example, different rendering engines 130 may provide results for different pixels. At a given time, results generated by the rendering engines 130 are merged (e.g., by a merger 140) to produce a merged result. The merged result is provided to the front-end client 110. The front-end client 110 may control a display, e.g., an external monitor, to display snapshots of the merged result. As such, the artist may evaluate progressive results of the changes that he or she had initiated.

According to various embodiments of the present invention, multi-machine rendering may be used in providing an interactive feedback loop that allows an artist to make (or initiate) changes to a scene and monitor the results. However, it is understood that features described herein can be applied in other rendering contexts, including single-machine rendering.

According to at least one embodiment, the display of an image that is rendered via an interactive loop or process is presented over time, based on information for the image that is updated over time. With respect to a given time, the information for the image may be referenced as a "snapshot" of the image at the given time.

With respect to data that is sent from the sender to the receiver, according to one or more embodiments, delta information is created, and the delta information is encoded into a message, in a manner such that smaller (or shorter) messages and/or reduced latency is obtained. As a result, the sending of image data to a front-end client (e.g., front-end client 110) can be improved. It is understood that the front-end computer may be updating the displayed image (e.g., in one thread) in parallel with performing other front-end tasks (e.g., in other threads).

Regarding the rendering computation(s) performed at a receiver, according to at least one embodiment, a thread which performs the rendering task is completely independent from a data-sending thread. For example, the rendering may occur in a shared-memory thread that is separate from the data-sending thread. As such, transmission of data need not halt rendering.

During rendering, information for the image is computed at one or more back-end computers (e.g., rendering engines 130). At each interval (e.g., each of user-defined, periodic intervals), a snapshot of the information is saved. The resulting snapshots are sent to a front-end client (e.g., the front-end client 110) for display. For example, the snapshots are sent back to an artist's workstation for display on a monitor. The computation of information and the subsequent sending of snapshots may be performed continually until rendering of the image is complete (or deemed to be complete). As such, the artist is able to review image rendering results while the rendering is still in progress. As will be described in more detail below, the information for the image may be provided based on blocks of tiles, each block including one or more tiles.

Figure 2:
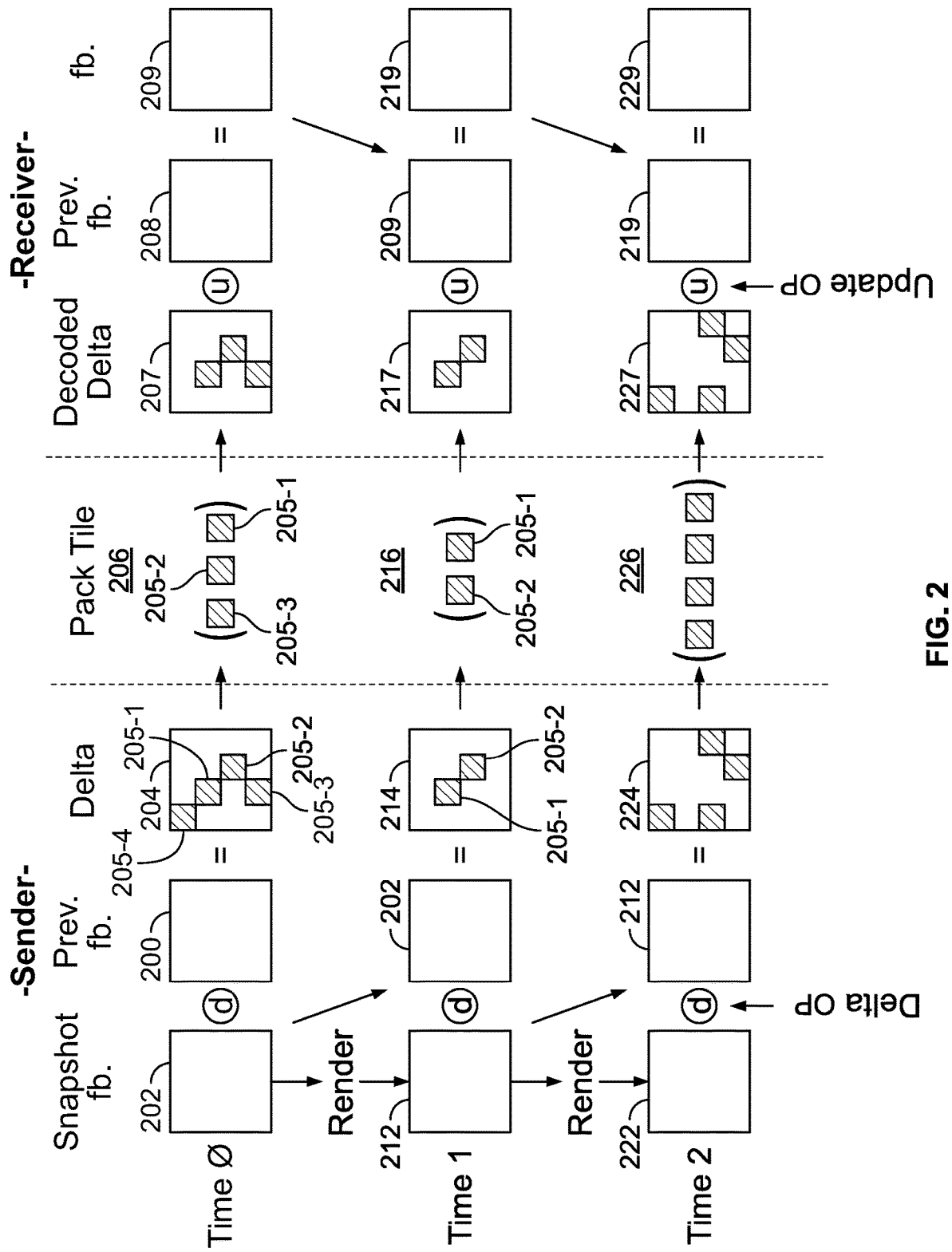
FIG. 2 is a diagram illustrating operations of a sender and a receiver according to at least one embodiment.

FIG. 2 is a diagram illustrating operations of a sender (e.g., a back-end rendering engine 130) and a receiver (e.g., a front-end client 110) according to at least one embodiment.

For purposes of simplicity, FIG. 2 illustrates operations of a single back-end rendering engine. However, it is understood that features described can be applied to systems utilizing two or more rendering engines.

As will be described in more detail below with reference to FIG. 2, according to at least one embodiment, the sender creates delta information between a current rendered image data and image data that was sent by the sender at a previous user-defined interval (e.g., an immediately prior interval). In this manner, information regarding only updated active tiles are sent by the sender to the receiver (e.g., the front-end client 110). As such, information regarding tiles that are unchanged since the previous interval are not sent to the receiver.

As illustrated in FIG. 2, information regarding only updated active tiles is sent at three different times—at time t=time0, at time t=time1, and at time t=time2. The time t=time0 is followed by the time t=time1, which, in turn, is followed by the time t=time2.

At time t=time0, the sender compares information of a current rendered image against information of the image at a previous time. For example, the sender compares a snapshot 202 of a frame buffer being actively updated by a rendering operation (or rendering thread) against a snapshot 200 of the frame buffer at a previous time. The length of time separating time0 from the previous time may be defined by a user. The comparison generates delta information 204, which is sent to the receiver.

If previous information is not available (e.g., because the snapshot 202 is of an initial frame), then empty (or null) data may be used as the previous information. Therefore, in such a situation, empty data may be used as the snapshot 202. Similarly, according to one or more embodiments, empty (or null) data may be used as the previous information when a re-render is initiated (i.e., when a current render is stopped, and a new render is started). In this regard, a render status (e.g., re-render status) may be sent by the sender to the receiver. The render status may be sent in a message 206, which will be described in more detail below. As such, when a re-render is initiated, the receiver is informed to reset its own frame buffer(s).

With continued reference to the time t=time0, delta information 204 includes information regarding three different tiles in total (tiles 205-1, 205-2 and 205-3). Each of these three tiles includes at least one pixel that is determined to have been updated (e.g., based on the results of the above comparison).

The concept of tiles refers to regions of pixels that are adjacent to each other. An image can be considered as being composed of multiple tiles, each of which covers a region of M×N pixels, where M and N denote respective integers. It is understood that, when M is equal to N, each tile covers a square region of pixels (e.g., a region of 8×8 pixels). Each tile can be accessed (or identified) by a unique identifier (e.g., tileId). For example, values of the tileId may range from 0 to (X−1), where X denotes the total number of tiles.

As noted earlier, information regarding tiles that are unchanged since the previous interval are not sent to the receiver. For example, with continued reference to the time t=time0, the tile 205-4 does not include at least one pixel that is determined to have been updated. Accordingly, the delta information 204 does not include information regarding the tile 205-4 and other such tiles.

The delta information 204 is included in a message 206. As described earlier, the delta information 204 includes information regarding the tiles 205-1, 205-2 and 205-3, but not tiles such as the tile 205-4. The message 206 may further include the respective identifiers (e.g., tileIds) of the tiles 205-1, 205-2 and 205-3. Accordingly, a receiver of the message 206 is able to interpret the message as carrying information regarding these three particular tiles.

The information regarding the tiles 205-1, 205-2 and 205-3 may be presented in the message 206 according to a particular sequence (e.g., in order of increasing tileId, or of decreasing tileId). Accordingly, a receiver of the message 206 may be better able to map particular information as pertaining to a particular tile.

According to at least one embodiment, the message 206 may further include, for each of the tiles 205-1, 205-2 and 205-3, a respective pixel mask that identifies the one or more pixels in the tile that are updated pixels (e.g., active pixels). Each bit of the pixel mask uniquely corresponds to a respective pixel of the tile. (For example, each pixel may correspond to a particular bit position within the pixel mask.) As such, when each of the tiles 205-1, 205-2 and 205-3 has dimensions of 8×8 pixels, each of the pixel masks is 64 bits in length. In this regard, it is understood that the length of the pixel masks may be shorter or longer to accommodate tiles of smaller or larger dimensions. According to at least one embodiment, similar to information regarding tiles that are unchanged, information regarding pixels that are unchanged since the previous interval are not sent to the receiver.

A particular bit in the pixel mask is set to a specific value (e.g., 1) if the corresponding pixel in the tile is updated (active). Conversely, a particular bit is set to a specific value (e.g., 0) if the corresponding pixel in the tile is not updated.

In embodiments where the message 206 includes the pixel mask(s), a receiver of the message 206 is able to interpret the message as carrying information regarding one or more particular pixels of each identified tile. For example, the receiver is able to interpret that the message 206 as carrying information regarding one or more particular pixels of tile 205-1, one or more particular pixels of tile 205-2 and one or more particular pixels of tile 205-3.

For each of the noted tiles, the information regarding the particular pixels may be presented in the message 206 according to a specific sequence (e.g., in order of increasingly significant bit position within the pixel mask, or decreasingly significant bit position within the pixel mask).

Accordingly, a receiver of the message 206 may be better able to map particular information as pertaining to a particular pixel of a given tile.

With continued reference to FIG. 2, at time t=time1, the sender compares information of a current rendered image against information of an image at a previous time. For example, the sender compares a snapshot 212 of a frame buffer being actively updated by a rendering operation (or rendering thread) against the snapshot 202 of the frame buffer that had been current at the previous time t=time0. The comparison generates delta information 214, which is sent to the receiver.

In a manner similar to that described earlier with reference to delta information 204, delta information 214 includes information regarding two different tiles in total (tiles 205-1 and 205-2). Each of these two tiles includes at least one pixel that is determined to have been updated (e.g., based on the results of the above comparison).

As described earlier with reference to the delta information 204, delta information 214 does not include information regarding tiles that are unchanged since the previous interval. For example, at the time t=time1, it is determined that the tile 205-3 does not include at least one pixel that is determined to have been updated. Accordingly, the delta information 214 does not include information regarding the tile 205-3 and other such tiles.

The delta information 214 is included in a message 216. In a manner similar to that described earlier with reference to the message 206, the message 216 may further include the respective identifiers of the tiles 205-1 and 205-2. Accordingly, a receiver of the message 216 is better able to interpret the message as carrying information regarding these two particular tiles.

Also, in a manner similar to that described earlier with reference to the message 206, the message 216 may further include, for each of the tiles 205-1 and 205-2, a respective pixel mask that identifies the one or more pixels in the tile that are updated pixels (e.g., active pixels). Accordingly, a receiver of the message 216 is better able to interpret the message as carrying information regarding one or more particular pixels of each identified tile.

At the time t=time2, the sender compares information of a current rendered image against information of the image at a previous time. For example, the sender compares a snapshot 222 of a frame buffer being actively updated by a rendering operation (or rendering thread) against the snapshot 212 of the frame buffer that had been current at the previous time t=time1. The comparison generates delta information 224, which is sent to the receiver.

In a manner similar to that described earlier with reference to delta information 204, delta information 224 includes information regarding four different tiles in total. Each of these four tiles includes at least one pixel that is determined to have been updated (e.g., based on the results of the above comparison). The delta information 224 does not include information regarding tiles that are unchanged since the previous interval.

The delta information 224 is included in a message 226. In a manner similar to that described earlier with reference to the message 206, the message 226 may further include the respective identifiers of the noted four tiles. Accordingly, a receiver of the message 226 is better able to interpret the message as carrying information regarding these noted four tiles.

Also, in a manner similar to that described earlier with reference to the message 206, the message 226 may further include, for each of the noted four tiles, a respective pixel mask that identifies the one or more pixels in the tile that are updated pixels (e.g., active pixels). Accordingly, a receiver of the message 226 is better able to interpret the message as carrying information regarding one or more particular pixels of each identified tile.

As such, each of the data messages 206, 216 and 226 includes information regarding tiles that have been updated with respect to a respective earlier time. Accordingly, the sizes (or lengths) of the messages 206, 216 and 226 that are sent to the receiver are potentially reduced. For example, at or around the time t=time0, time1 or time2, the size (or quantity) of data that is sent by the sender to the receiver is potentially increasingly smaller as the total number of updated tiles decreases.

For example, as described earlier with reference to FIG. 2, the delta information 214 includes information regarding fewer tiles, as compared to the delta information 204. As illustrated in FIG. 2, the delta information 214 includes information regarding a total of two tiles, as compared with the delta information 204, which includes information regarding a total of three tiles. Accordingly, the size of the data message 216 is potentially smaller than the size of the data message 206.

According to one or more embodiments, data regarding active pixels are output without using data compression technique(s) (e.g., without using any lossy data compression techniques) to compress the data. For example, regarding the message 206, the information regarding one or more particular pixels of tile 205-1, one or more particular pixels of tile 205-2 and/or one or more particular pixels of tile 205-3, are included in the message 206, without using one or more lossy compression techniques. Accordingly, such embodiments are distinguishable from approaches that use lossy data compression (e.g., compression with 8-bit data quantization) to compress image data, to reduce bandwidth usage. In the context of environments involving interactive lighting sessions, use of such data compression techniques may not be acceptable, due to a preference (or desire) to send/receive information of the image in an original (e.g., uncompressed) level of precision.

The operations of the sender, as illustrated in FIG. 2, may be performed concurrently with rendering operations. For example, delta information (e.g., delta information 204, 214 and 224) may be created and then sent (e.g., via messages 206, 216 and 226, respectively) without necessarily stopping (or otherwise adversely affecting) the execution of rendering operations. As such, delta information may be created while the rendering threads are actively updating data of the image.

According to at least one embodiment, the data-sending operations may be performed independently of the logic associated with rendering itself. Accordingly, the data-sending operations can be executed without dependency on the rendering operations. This may result, for example, when the data-sending operations run asynchronously according to a separate timing, rather than according to a timing that is common to both the data-sending operations and the rendering operations. As a result, it is understood that rendering need not be stopped when delta information is generated and sent.

The image information described earlier with reference to FIG. 2 may be information regarding a particular Arbitrary Output Value (AOV) layer. According to at least one embodiment, information regarding a single rendered image includes several AOV layers (e.g., tens of AOV layers).

Generally speaking, images produced by cameras (e.g., a digital camera) may include only such a single AOV layer (e.g., color information).

Unlike such devices, renderers such as rendering engines 130 produce, for each pixel, various detail information for other AOV layers. For example, the rendering engines 130 may produce information other than (or in addition to color information), and the information that is to be saved as part of image data may be specified by a user. Such information can be classified as AOV layers or channels. By way of example, apart from color information, different AOV layers may include information pertaining to alpha, object ID, surface normal, illumination coming from diffuse lighting, illumination coming from transparency, illumination coming from reflection, illumination coming from a particular light, UV tangents, world space position of the surface point, etc.

According to at least one embodiment, snapshots of each AOV layer may be generated in parallel, with each AOV layer being processed in the manner described earlier with reference to FIG. 2. Information regarding each such AOV layer may be produced and sent to the receiver independently of one another. As will be described in more detail later regarding the receiver, the receiver may receive the information of each AOV layer in parallel and decode the information for use in reconstructing the image.

It is recognized that, strictly speaking, snapshots for generating delta data of the AOV layers may be generated at slightly different times. As such, the snapshot time(s) of a particular AOV layer (e.g., a layer including alpha information) may not perfectly match the snapshot time(s) of a different AOV layer (e.g., a layer including object ID information). Further, with respect to data for a particular AOV layer, itself, snapshots of the pixels may be generated at slightly different timings as well.

As described earlier with reference to at least one embodiment, the rendering task operates in parallel during generation of delta data. As a result, snapshot output data may not be created at a single particular moment (or instant), but instead may include data which was generated over some span of timing (e.g., the length of time required to scan the AOV layer and construct the delta data).

However, according to at least one embodiment, this is not problematic because image data is not generated based on a single moment. Rather, the order of receipt (e.g., at the receiver) is used for reconstruction.

Because all the pixels that the renderer produces are eventually transmitted to the front-end computer, the final image that is displayed for viewing by the artist will (or should) be equivalent to the image as rendered by the back-end renderers.

The creation of delta information (e.g., delta information 204, 214, 224) will now be described in more detail with reference to FIG. 3.

Figure 3:
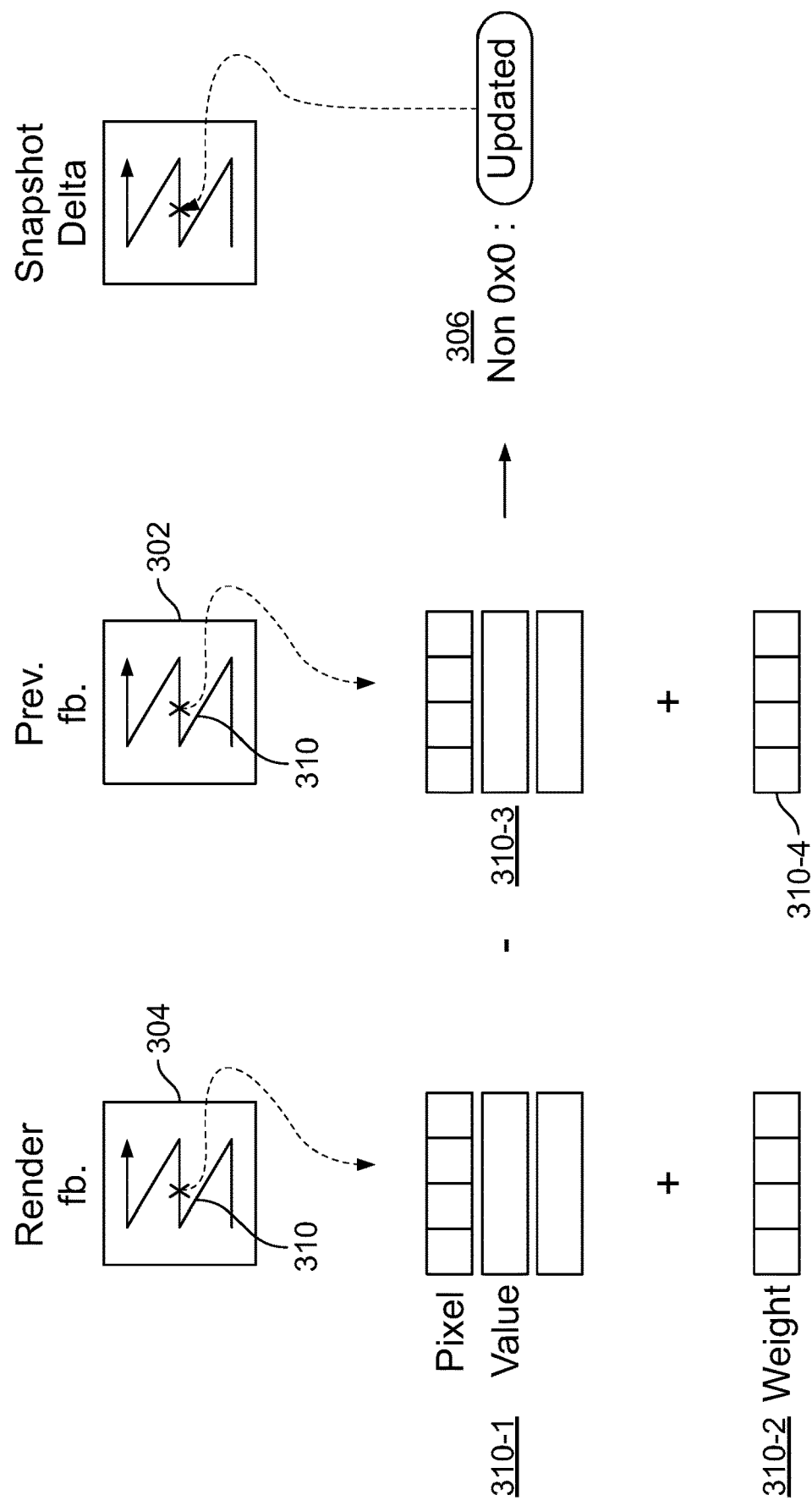
FIG. 3 is a diagram illustrating a simplified example of a comparison for creating delta information according to at least one embodiment.

FIG. 3 is a diagram illustrating a simplified example of a comparison for creating delta information. As described earlier with reference to FIG. 2, the comparison is between information of a current rendered image and information of the image at a previous time. According to the example of FIG. 3, one comparison (or one set of comparisons) is between information 304 of a current rendered image and information 302 of the image at a previous time. For purposes of illustration, the information 304 and 302 may correspond, respectively, to snapshot 212 and 202 of FIG. 2. The information 304 may include two values: a pixel value 310-1 and a weight value 310-2. Similarly, the information 302 may include two values: a pixel value 310-3 and a weight value 310-4.

The pixel values 310-1 and 310-3 may correspond to data of a particular AOV layer, at different times, for a particular pixel. As described earlier regarding AOV layers, the pixel values 310-1 and 310-3 may be values pertaining to color, alpha, object ID, surface normal, etc. By way of example, with reference also to FIG. 2, the pixel value 310-1 may correspond to an alpha value that is included in the snapshot 212, and the pixel value 310-3 may correspond to an alpha value that is included in the snapshot 202.

The weight values 310-2 and 310-4 correspond to sampling weight information of the pixel. According to at least one embodiment, the sampling weight information relates to the number of samples (rays) shot into a given pixel at a particular time. As described earlier, a pixel may have multiple different AOV layers. In this situation, a pixel has multiple different pixel values at a given time. However, according to at least one embodiment, the pixel may have only a single weight value at such a time. In such a situation, the multiple different pixel values (corresponding to different AOV layers) share a common weight value at such a time.

Accordingly, the weight value 310-2 may relate to the number of samples (rays) shot into a given pixel at a current time. The weight value 310-2 may relate not only to the pixel value 310-1 but also to other pixel values corresponding to the current time. Similarly, the weight value 310-4 may relate to the number of samples (rays) shot into the pixel at a previous time. The weight value 310-4 may apply not only to the pixel value 310-3 but also to other pixel values corresponding to the previous time.

According to at least one embodiment, the comparison between information of the current rendered image and the information of the image at the previous time includes comparing the pixel value 310-1 and the pixel value 310-3 against each other. In addition, the comparison may also include comparing the weight value 310-2 and the weight value 310-4 against each other. If there is a nonzero difference between the pixel values 310-1 and 310-3 and/or there is a nonzero difference between the weight values 310-2 and 310-4, then it may be determined that the pixel has changed at the current time.

For example—with reference to FIG. 3, comparing (a) a concatenation of the pixel value 310-1 and the weight value 310-2 and (b) a concatenation of the pixel value 310-3 and the weight value 310-4 against each other produces a result 306. According to at least one embodiment, the result 306 is produced by performing bitwise compare operations between (a) the concatenation of the pixel value 310-1 and the weight value 310-2 and (b) the concatenation of the pixel value 310-3 and the weight value 310-4.

If the result 306 is not equal to zero, then it may be determined that the pixel has changed at the current time. In this situation, information regarding the pixel (e.g., the result 306) is provided to the receiver of FIG. 2.

Otherwise, if both the pixel value 310-1 is equal to the pixel 310-3 and the weight value 310-2 is equal to the weight value 310-4, then it is determined that the pixel has not changed at the current time. In this situation, according to at least one embodiment, information regarding the pixel is not sent to the receiver of FIG. 2.

According to at least one embodiment, if a difference is identified in a particular pixel, then information pertaining to the difference in the pixel is sent to the receiver. For example, the pixel value 310-1 may not be equal to the pixel 310-3 and/or the weight value 310-2 may not be equal to the weight value 310-4. In this situation, the (nonzero) result 306 may be sent to the receiver. If the pixel values 310-1 and 310-3 correspond to alpha values, then the nonzero result in the alpha layer is sent to the receiver, independent of whether a difference(s) is identified in another AOV layer(s) for the pixel at issue. Here, it is assumed that the rendering engine interactively produces results in response to changes initiated by a user, e.g., with regards to lighting conditions and/or other variables.

According to at least one embodiment, comprehension of the underlying meaning (or importance) of the data itself (e.g., pixel values 310-1 and 310-3) is not necessarily required of the sender. It is understood that any kind or type of data may be processed and considered for transmission to the receiver as long as the data has a particular meaning and is quantifiable.

According to at least one embodiment, the comparison described with reference to FIG. 3 is performed for each AOV layer independently. This is based on a recognition that the AOV data can, in total, include many bytes (e.g., dozens of bytes) of information. Because the rendering process moves quickly, and because it may be preferable to avoid any locking in the rendering process (e.g., any locking of the render thread), a race condition can arise. In more detail, the snapshots of the different AOV layers are performed independently of each other and may occur at slightly different timings. Over a period of time in which all AOV information is copied (or transferred) into a particular buffer (e.g., a sending buffer), the renderer may have updated the weight value of the pixel one or more times. In such a situation, different AOV layers may, in reality, have different weight values. However, if such different AOV layers are configured to share a common weight value, a comparison that is performed (see, e.g., of FIG. 3) for a particular AOV layer may not be based on an accurate representation of the weight value. For example, as explained earlier with reference to FIG. 3, the concatenation of the pixel value 310-1 and the weight value 310-2 is compared against the concatenation of the pixel value 310-3 and the weight value 310-4. If a common weight value is used as the weight value 310-4, this common weight value may not accurately reflect the true value of the weight value 310-4. For example, for a particular AOV layer, the renderer may have updated the weight value of the pixel. However, by the time of this update, some other value (i.e., a value that does not reflect the update) may have been already adopted as the common weight value. In this situation, the common weight value (i.e., the adopted other value) does not accurately represent the true value of the weight value 310-4.

According to least one embodiment, such a race condition may be addressed by storing the weight values for the different AOV layers, in contrast to configuring different AOV layers to share a common weight value, as described earlier. The weight values stored for different AOV layers may be different. For example, as illustrated in FIG. 4, the weight values may be stored together with the corresponding AOV values for the pixel in an independent snapshot.

Figure 4:
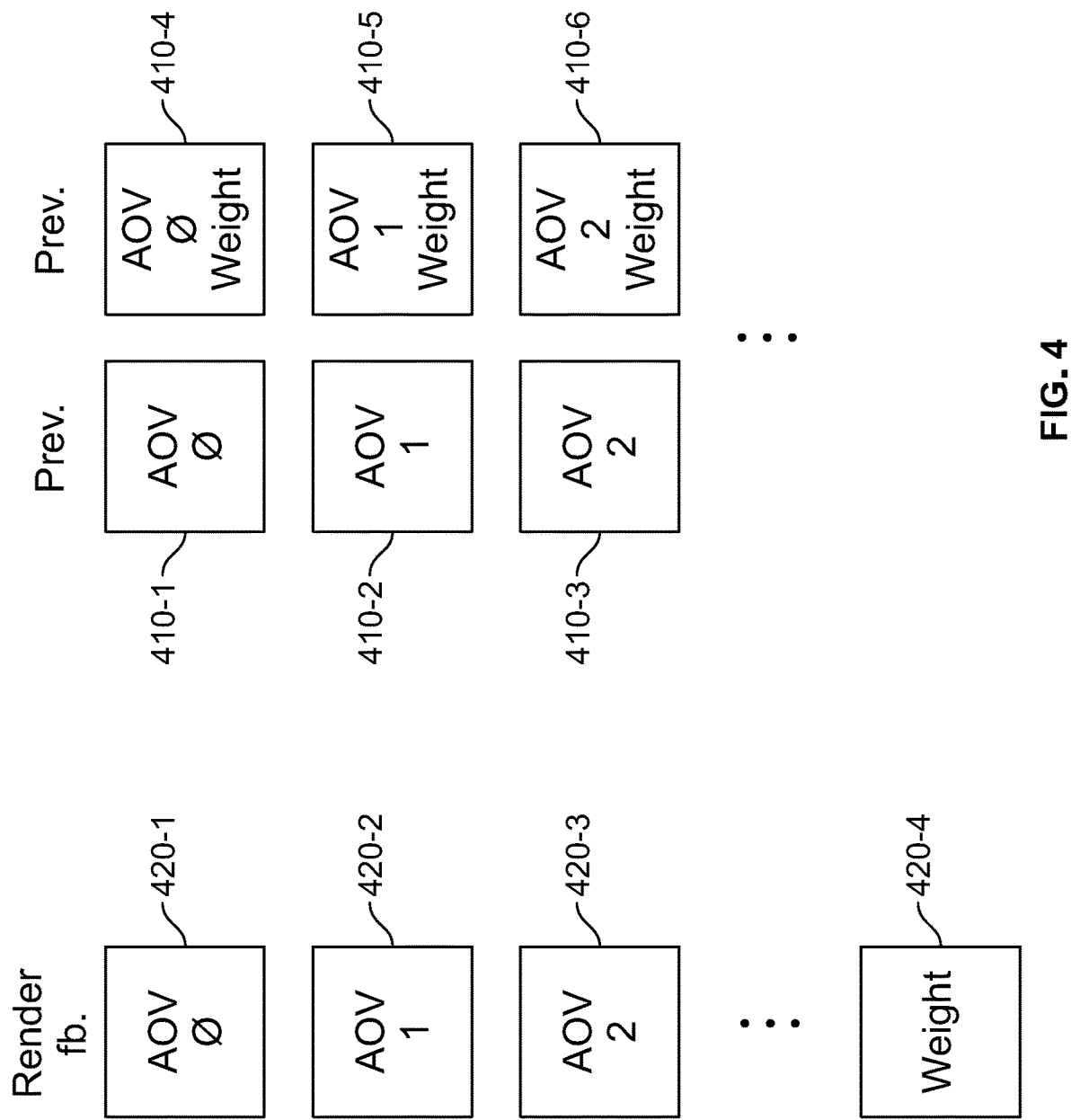
FIG. 4 illustrates an example of weight values stored together with corresponding arbitrary output value (AOV) values for a pixel in an independent snapshot according to at least one embodiment.

With reference to FIG. 4, a weight value 410-4 is stored for an AOV value 410-1. The weight value 410-4 reflects the weight value of the pixel at the time that the AOV value 410-1 was captured (or recorded). Similarly, a weight value 410-5 is stored for an AOV value 410-2. The weight value 410-5 reflects the weight value of the pixel at the time that the AOV value 410-2 was captured (or recorded). Similarly, weight value 410-6 is stored for an AOV value 410-3. The weight value 410-6 reflects the weight value of the pixel at the time that the AOV value 410-3 was captured (or recorded).

The AOV values 410-1, 410-2 and 410-3 correspond to different AOV layers. The weight values 410-4, 410-5 and 410-6 may be unequal to each other.

The stored pairings may be utilized as previous data similar to the manner which was described earlier with reference to the information 302 of FIG. 3. For example, the AOV value 410-1 may be compared against a current AOV value 420-1, and the weight value 410-4 may be compared against a current weight value 420-4. As another example, the AOV value 410-2 may be compared against a current AOV value 420-2, and the weight value 410-5 may be compared against the current weight value 420-4. As yet another example, the AOV value 410-3 may be compared against a current AOV value 420-3, and the weight value 410-6 may be compared against the current weight value 420-4. Here, the current AOV values 420-1, 420-2 and 420-3 all share the common weight value 420-4.

According to at least one embodiment, the storing of potentially different weight values for different AOV layers is performed when a non-zero difference is identified between values of a particular AOV layer (e.g., when there is a non-zero difference between the pixel values 310-3 and 310-1 of FIG. 3). The operation of storing such weight values accounts for a majority of the cost of the delta comparison operation itself (see, e.g., FIG. 3). The mathematical operations can be performed relatively quickly compared to the storage operations. The cost (e.g., computation cost) of such storing operations is related to the number of differences in the snapshots. For example, the cost is higher (or increased) when a greater number of pixels of the image are different and updated, and the cost is lower (or decreased) if only a fewer number of pixels are different and updated.

The image itself is actively and constantly updated by the rendering thread. As such, according to at least one embodiment, the delta comparison operation may be rendered computationally lighter if shorter time intervals are used to generate delta data. This also aids in achieving a shorter latency.

After the generation of delta information is executed, each AOV layer has pixel values and weight values for use in potentially generating the next delta information, e.g., at a following interval. For example, as explained earlier with reference to FIG. 2, the snapshot 202 is considered current at the time t=time0. However, at the time t=time1, the snapshot 202 is used for comparison against a current snapshot 212. As such, the snapshot 202 is for use in generating the next delta information (e.g., delta information 214).

According to at least one embodiment, the timing of the generation of the delta information for each AOV layer and/or the order in which different AOV layers are processed need not be of concern. Also, the timing of the generation of the delta information for each pixel and the order in which different pixels are processed need not be of concern. This implies that the speed optimization can be more readily achieved by using a multi-threaded implementation.

However, according to at least one other embodiment, a schedule may be adjusted to improve performance. For example, data can be transferred to the receiver more efficiently by configuring the rendering pixel sampling order to minimize delta data for every snapshot.

According to one approach, a renderer is scheduled to sparsely sample the entire image at the beginning stage of image rendering, in order to gain (or build) an understanding of the whole image relatively quickly. As a result, some understanding (e.g., a rough understanding) of the entire image can be gained at a reasonably small cost.

As the image rendering progresses, the schedule of the rendering process is gradually changed to focus more on particular pixels, and less on the image as a whole. For example, as rendering progresses, each pixel may be sampled with more rays. This tends to generate more identified differences pertaining to those pixels currently being sampled, instead of generating more identified differences across the entire image.

According to this approach, an image initially is sparsely sampled, and then focus is directed towards concentrating on refining each pixel in turn. At the very beginning of the rendering process, the entire image is likely updated at once (e.g., over a single iteration). But, as rendering progresses, the rendered image is updated at an increasingly local level.

According to at least one embodiment, the approach described above with reference to adjustment of rendering schedule is adopted in conjunction with the delta data generation techniques described herein with reference to various embodiments. For example, as rendering progresses, the renderer works more locally, and the quantity of the resulting produced delta information may remain small. In this situation, the cost of delta generation is also small. Accordingly, shorter latency can be achieved.

According to at least one embodiment, the receiver side receives data (e.g., messages 206, 216 and 226) and reconstructs the delta information, e.g., in a temporary area that may not be displayed for viewing by a user.

At the receiver side, received data may be maintained in order of receipt timestamp. The image that is to be displayed (for viewing by the user) is reconstructed from the received data, which may be processed in the order that the data was received. If reconstruction is processed according to received order, then the reconstructed image will (or should) match the image produced at the back-end sender.

Assuming that a receiver has knowledge of the pixels that have changed as well as of the pixel order in which the delta information is provided, the receiver may be able to properly decode the received delta information. For example, if the data messages include information identifying the changed pixels (as reflected in the tileIds and pixel masks) and provide information in a particular order (e.g., in order of increasingly significant bit position within the pixel mask, or decreasingly significant bit position within the pixel mask), then the receiver may be able to properly decode the received delta information.

For example, with reference back to FIG. 2, the receiver receives the message 206 and decodes the received delta information (corresponding to delta information 204) as delta information 207.

Upon producing the delta information 207, the receiver uses this information to update previous pixel information (e.g., previous frame buffer 208), thereby producing current pixel information (e.g., frame buffer 209). The frame buffer 209 should match the image produced at the back-end sender (e.g., frame buffer 202).

At time t=time1, the frame buffer 209 has replaced buffer 208 as the previous pixel information. The receiver receives the message 216 and decodes the received delta information (corresponding to delta information 214) as delta information 217. Upon producing the delta information 217, the receiver uses this information to update previous pixel information (e.g., previous frame buffer 209), thereby producing current pixel information (e.g., frame buffer 219). The frame buffer 219 should match the image produced at the back-end sender (e.g., frame buffer 212).

At time t=time2, the frame buffer 219 has replaced buffer 209 as the previous pixel information. The receiver receives the message 226 and decodes the received delta information (corresponding to delta information 224) as delta information 227. Upon producing the delta information 227, the receiver uses this information to update previous pixel information (e.g., previous frame buffer 219), thereby producing current pixel information (e.g., frame buffer 229). The frame buffer 229 should match the image produced at the back-end sender (e.g., frame buffer 222).

Accordingly, pixel information is successively replaced with the updated pixel information based on reconstructed delta information. If the delta information is reconstructed in the order in which the delta information was received, the user is able to view a progressively updated rendered image.

According to some prior approaches, lossy data compression techniques (e.g., lossy data compression techniques employing 8-bit data quantization) have been used to reduce bandwidth usage. In contexts such as environments in which interactive lighting sessions are facilitated, using lossy data compression may not be acceptable, e.g., because of a preference (or desire) to use data retaining its original (e.g., uncompressed) data precision.

Also, some prior approaches address transmission of only particular information such as only primary color and/or only alpha information. Such approaches may possibly result in reduced bandwidth usage. However, such approaches may not acceptable in contexts such as environments in which interactive lighting sessions are facilitated, e.g., because of a preference (or desire) to process AOV information other than (or in addition to) primary color and/or alpha information.

According to various embodiments disclosed herein, data messages are sent from a back-end renderer to a front-end client in a more stable and efficient manner. One or more features of embodiments disclosed may be particularly advantageous, e.g., when the back-end rendering engine is resident on a host that is different from the front-end client, and the back-end renderer communicates with the front-end client via a connection (or channel) having a limited bandwidth. As a result, a concern that is potentially associated with using resources of one or more different hosts for performing rendering operations may be addressed.

It is understood that features described may also apply when multiple hosts (e.g., multiple remote hosts) are used. As such, an improved use of computing resources can be provided. For example, by improving latency, a user's time may be better utilized. For example, an artist may be afforded more flexibility in making often-rapid decisions concerning changes (e.g., lighting changes) while participating in an interactive rendering session.

Figure 5:
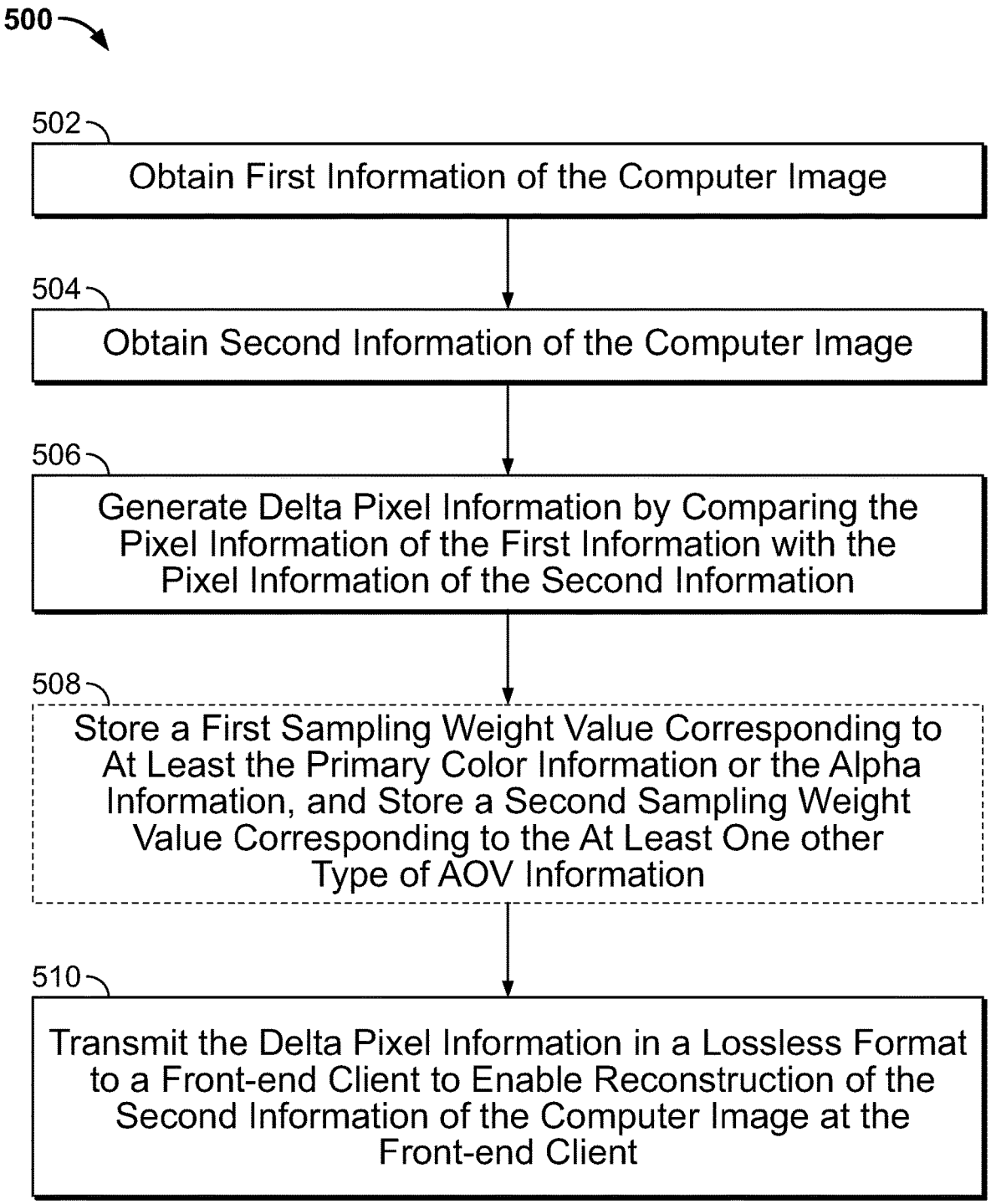
FIG. 5 is a flowchart illustrating a method for facilitating an interactive rendering of a computer image according to at least one embodiment.

FIG. 5 illustrates a flowchart of a method 500 of rendering a computer image at a remote computer according to at least one embodiment.

At block 502, first information of the computer image is obtained at a first time. The first information includes pixel information of the computer image at the first time.

For example, with reference to FIG. 2, a frame buffer 202 is obtained at a first time t=time0. The frame buffer 202 includes pixel information of the computer image at the first time t=time0.

At block 504, second information of the computer image is obtained at a second time following the first time. The second information includes pixel information of the computer image at the second time.

For example, with reference to FIG. 2, a frame buffer 212 is obtained at a second time t=time1. The frame buffer 212 includes pixel information of the computer image at the second time t=time1.

At block 506, delta pixel information is generated by comparing the pixel information of the first information with the pixel information of the second information. The delta pixel information is generated to include one or more portions of the pixel information of the second information that are updated since the first information was obtained. The delta pixel information is generated to exclude one or more portions of the pixel information of the second information that are unchanged since the first information was obtained.

For example, with reference to FIG. 2, delta pixel information 214 is generated by comparing the frame buffer 202 with the frame buffer 212. The delta pixel information 214 is generated to include pixel information of tiles 205-1 and 205-2 that are updated since the frame buffer 202 was obtained. The delta pixel information 214 is generated to exclude pixel information of tiles such as tiles 205-3 and 205-4 that are unchanged since the frame buffer 202 was obtained.

According to at least one further embodiment, the delta pixel information is generated without using a form of lossy data compression.

According to at least one further embodiment, the one or more portions of the pixel information of the second information that are updated since the first information was obtained include at least primary color information or alpha information, and further include AOV information other than the primary color information and the alpha information.

According to at least one further embodiment, at block 508, a first sampling weight value corresponding to at least the primary color information or the alpha information is stored. A second sampling weight value corresponding to the AOV information other than the primary color information and the alpha information is stored. The first sampling weight value may be different from the second sampling weight value.

For example, with reference to FIG. 4, a first sampling weight value 410-4 corresponding to the pixel value 410-1 is stored. A second sampling weight value 410-5 corresponding to the pixel value 410-2 is stored. The first sampling weight value 410-4 may be different from the second sampling weight value 410-5.

At block 510, the delta pixel information is transmitted in a lossless format to a front-end client to enable reconstruction of the second information of the computer image at the front-end client.

For example, with reference to FIG. 2, the delta pixel information 214 is transmitted (e.g., in message 216) in a lossless format to a front-end client (e.g., front-end client 110 of FIG. 1), to enable reconstruction of the frame buffer 212 (e.g., see frame buffer 219) at the front-end client.

According to at least one further embodiment, transmitting the delta pixel information includes transmitting an identifier (e.g., a tileId) of the first tile that indicates a position of the first tile in the computer image.

According to at least one further embodiment, transmitting the delta pixel information includes transmitting information (e.g., a pixel mask) indicating a position, in the first tile, of the at least one pixel that is updated since the first information was obtained.

According to at least one further embodiment, transmitting the delta pixel information includes transmitting the delta pixel information in a sequential order based on the information indicating the position, in the first tile, of the at least one pixel. For example, the delta pixel information may be transmitted according to an increasingly significant bit position within the pixel mask, or a decreasingly significant bit position within the pixel mask.

Figure 6:
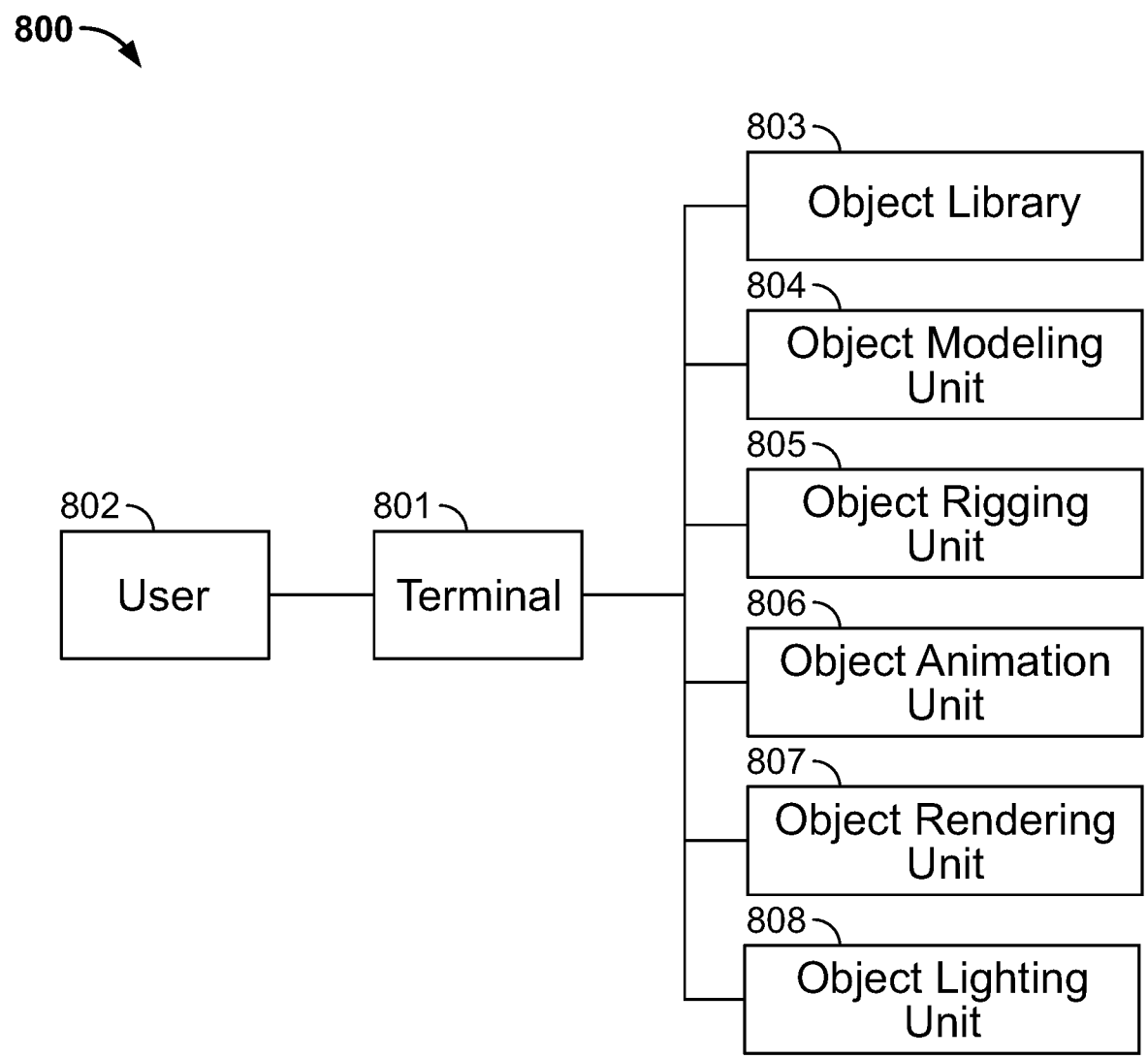
FIG. 6 is an illustration of a computing environment according to at least one embodiment.

Referring now to FIG. 6, a simplified block diagram of a system 800 for creating computer graphics imagery (CGI) and computer-aided animation is shown that may implement or incorporate various embodiments of the present disclosure. The system 800 may include one or more terminals 801. The one or more terminals 801 may include hardware and software elements configured for designing CGI and assisting with computer-aided animation. The terminals 801 may be implemented as a single computing device or a set of one or more computing devices, corresponding to computer hardware and/or software.

Examples of terminals 801 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 801 may be utilized at various stages of a production process, including pre-production, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 800, a user 802 may utilize the one or more terminals 801 to design, create, or modify objects within a computer-generated interface displayed on display associated with the terminal 801.

The terminal may implement, include, or otherwise be in operable communication with, systems and units including object library 803, object modeling unit 804, object rigging unit 805, object animation unit 806, object rendering unit 807, and object lighting unit 808. Object library 803 may include software and/or hardware elements configured for storing and accessing information related to objects to be accessed, requested, retrieved, and/or used by the one or more terminals 801 to design, create, and modify models (e.g., 3D models) of objects in the CGI and animation processes.

Object modeling unit 804 may include software and/or hardware elements and information to be accessed, requested, retrieved, and/or used by the one or more terminals 801 to sculpt and design the 3D model to take on the desired appearance as instructed by user 802, or other terminal operator during the CGI and animation process.

Object rigging unit 805 may include software and/or hardware elements and information to be accessed, requested, retrieved, and/or used by the one or more terminals 801 to design, create, or modify components of 3D models to define articulation points and movement ranges of various elements of the 3D model.

Object animation unit 806 may include software and/or hardware elements and information to be accessed, requested, retrieved, and/or used by the one or more terminals 801 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 807 may include software and/or hardware elements and information to be accessed, requested, retrieved, and/or used by the one or more terminals 801 to design, create, or modify a final appearance of the animated 3D model, including generating one or more images of one or more computer-generated objects, including textures, colors, rigging, controls, and the like.

Object lighting unit 808 may include software and/or hardware elements and information to be accessed, requested, retrieved, and/or used by the one or more terminals 801 to design, create, or modify lighting aspects of a 3D model and animated scenes, including defining lighting sources, shading, reflections, refractions, textures, colors, and the like.

The one or more terminals 801 may be in communication with one or more server computers which may operatively be in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 803, object modeling unit 804, object rigging unit 805, object animation unit 806, object rendering unit 807, object lighting unit 808, and the like. The one or more terminals 801, the one or more server computers, or any other aspect of the system 800, may be associated or coupled with a display configured to display information, including a displayed interface for displaying, performing, executing, instructing, reviewing, and/or selecting operations of the present disclosure.

Figure 7:
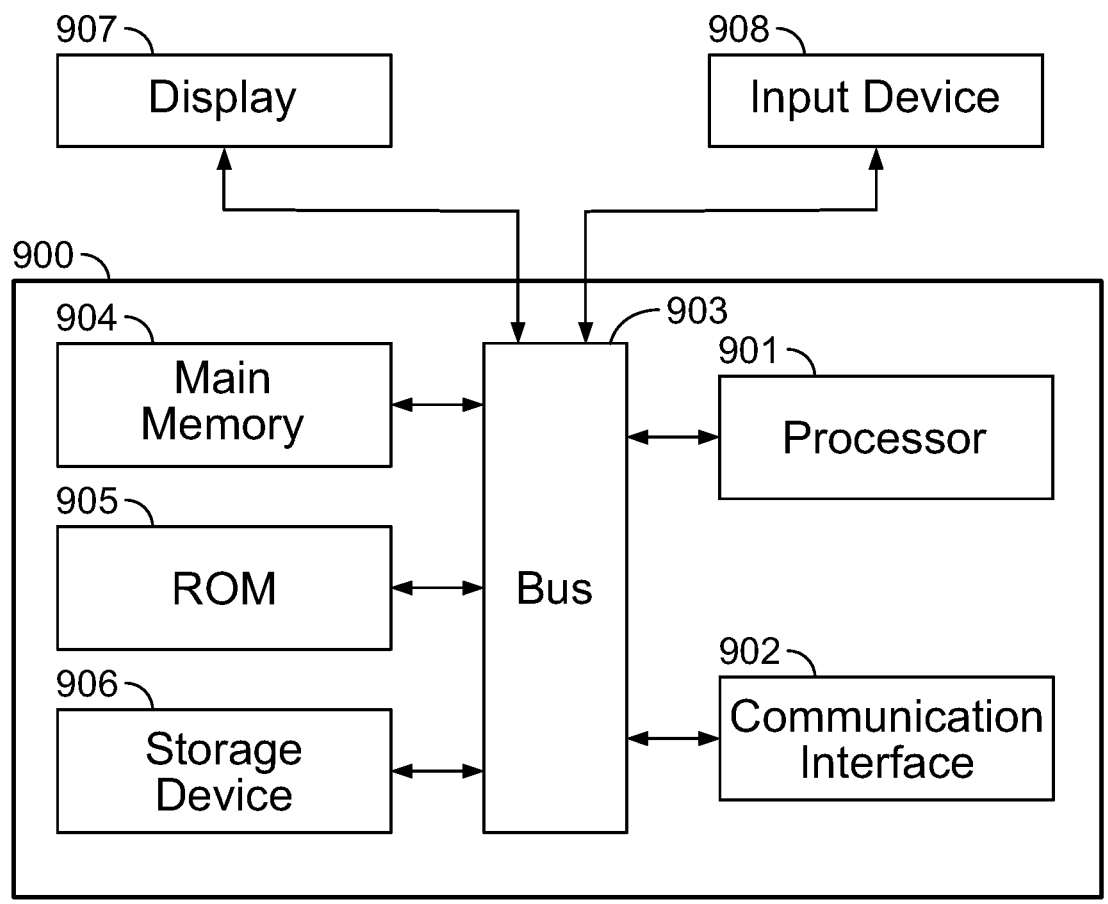
FIG. 7 is a block diagram of a device according to at least one embodiment.

Referring to FIG. 7, an illustration of an example computer 900 is provided. One or more of aspects of the system 800 discussed above in FIG. 6, such as the one or more terminals 801 or the one or more server computers, may be configured as or include such a computer 900. In selected embodiments, the computer 900 may include a bus 903 (or multiple buses) or other communication mechanism, a processor 901, main memory 904, read only memory (ROM) 905, one or more additional storage devices 906, and/or a communication interface 902, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 903 or other communication mechanism, including multiple such buses or mechanisms, may support communication of information within the computer 900. The processor 901 may be connected to the bus 903 and process information. In selected embodiments, the processor 901 may be a specialized or dedicated microprocessor configured to perform particular tasks in accordance with the features and aspects disclosed herein by executing machine-readable software code defining the particular tasks. Main memory 904 (e.g., random access memory—or RAM—or other dynamic storage device) may be connected to the bus 903 and store information and instructions to be executed by the processor 901. Main memory 904 may also store temporary variables or other intermediate information during execution of such instructions.

ROM 905 or some other static storage device may be connected to a bus 903 and store static information and instructions for the processor 901. An additional storage device 906 (e.g., a magnetic disk, optical disk, memory card, or the like) may be connected to the bus 903. The main memory 904, ROM 905, and the additional storage device 906 may include a non-transitory computer-readable medium holding information, instructions, or some combination thereof, for example instructions that when executed by the processor 901, cause the computer 900 to perform one or more operations of a method as described herein. A communication interface 902 may also be connected to the bus 903. A communication interface 902 may provide or support two-way data communication between a computer 900 and one or more external devices (e.g., other devices contained within the computing environment).

In selected embodiments, the computer 900 may be connected (e.g., via a bus) to a display 907. The display 907 may use any suitable mechanism to communicate information to a user of a computer 900. For example, the display 907 may include or utilize a liquid crystal display (LCD), light emitting diode (LED) display, projector, or other display device to present information to a user of the computer 900 in a visual display. One or more input devices 908 (e.g., an alphanumeric keyboard, mouse, microphone, stylus pen) may be connected to the bus 903 to communicate information and commands to the computer 900. In selected embodiments, one input device 908 may provide or support control over the positioning of a cursor to allow for selection and execution of various objects, files, programs, and the like provided by the computer 900 and displayed by the display 907.

The computer 900 may be used to transmit, receive, decode, display, or the like one or more video files. In selected embodiments, such transmitting, receiving, decoding, and displaying may be in response to the processor 901 executing one or more sequences of one or more instructions contained in main memory 904. Such instructions may be read into main memory 904 from another non-transitory computer-readable medium (e.g., a storage device).

Execution of sequences of instructions contained in main memory 904 may cause the processor 901 to perform one or more of the procedures or steps described herein. In selected embodiments, one or more processors in a multi-processing arrangement may also be employed to execute sequences of instructions contained in main memory 904. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 901, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 902 may provide or support external, two-way data communication to or via a network link. For example, a communication interface 902 may be a wireless network interface controller or a cellular radio providing a data communication network connection. Alternatively, a communication interface 902 may comprise a local area network (LAN) card providing a data communication connection to a compatible LAN. In any such embodiment, a communication interface 902 may send and receive electrical, electromagnetic, or optical signals conveying information.

A network link may provide data communication through one or more networks to other data devices (e.g., one or more terminals 801 as shown in the system 800). For example, a network link may provide a connection through a local network of a host computer or to data equipment operated by an Internet Service Provider (ISP). An ISP may, in turn, provide data communication services through the Internet. Accordingly, a computer 900 may send and receive commands, data, or combinations thereof, including program code, through one or more networks, a network link, and communication interface 902. Thus, the computer 900 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method of facilitating an interactive rendering of a computer image at a remote computer, the method comprising:
   at a first time, obtaining first information of the computer image, the first information comprising pixel information of the computer image at the first time;
   at a second time after the first time, obtaining second information of the computer image, the second information comprising pixel information of the computer image at the second time;
   generating delta pixel information by comparing the pixel information of the first information with the pixel information of the second information, and comparing a weight value corresponding to the first information with a weight value corresponding to the second information,
   wherein the weight value corresponding to the first information relates to a number of samples at the first time, and the weight value corresponding to the second information relates to a number of samples at the second time,
   wherein the delta pixel information is generated to include one or more portions of the pixel information of the second information that are updated since the first information was obtained, or a nonzero difference between the weight value corresponding to the first information and the weight value corresponding to the second information, and
   wherein the delta pixel information is generated to exclude one or more portions of the pixel information of the second information that are unchanged since the first information was obtained; and
   transmitting the delta pixel information to a front-end client to enable reconstruction of the second information of the computer image at the front-end client.

2. The method of claim 1, wherein the delta pixel information is generated without using a form of lossy data compression.

3. The method of claim 1, wherein:
   the computer image is formed by a plurality of tiles;
   the one or more portions of the pixel information of the second information that are updated corresponds to at least a first tile of the plurality of tiles, the first tile including at least one pixel that is updated since the first information was obtained; and
   the one or more portions of the pixel information of the second information that are unchanged corresponds to at least a second tile of the plurality of tiles, the second tile not including at least one pixel that is updated since the first information was obtained.

4. The method of claim 3, wherein transmitting the delta pixel information comprises transmitting an identifier of the first tile that identifies a position of the first tile in the computer image.

5. The method of claim 4, wherein transmitting the delta pixel information further comprises transmitting information indicating a position, in the first tile, of the at least one pixel that is updated since the first information was obtained.

6. The method of claim 5, wherein transmitting the delta pixel information further comprises transmitting the delta pixel information in a sequential order based on the information indicating the position, in the first tile, of the at least one pixel.

7. The method of claim 1, wherein the one or more portions of the pixel information of the second information that are updated since the first information was obtained include at least primary color information or alpha information, and further include arbitrary output value (AOV) information other than the primary color information and the alpha information.

8. The method of claim 7, further comprising:
   storing a first sampling weight value corresponding to at least the primary color information or the alpha information; and
   storing a second sampling weight value corresponding to the AOV information other than the primary color information and the alpha information.

9. The method of claim 8, wherein the first sampling weight value is different from the second sampling weight value.

10. The method of claim 1, wherein the remote computer is one of a plurality of remote computers for performing the interactive rendering of the computer image.

11. The method of claim 1, wherein transmitting the delta pixel information comprises transmitting the delta pixel information in a lossless format.

12. A machine-readable non-transitory medium having stored thereon machine-executable instructions for facilitating an interactive rendering of a computer image at a remote computer, the instructions comprising:
at a first time, obtaining first information of the computer image, the first information comprising pixel information of the computer image at the first time;
at a second time after the first time, obtaining second information of the computer image, the second information comprising pixel information of the computer image at the second time;
generating delta pixel information by comparing the pixel information of the first information with the pixel information of the second information, and comparing a weight value corresponding to the first information with a weight value corresponding to the second information,
wherein the weight value corresponding to the first information relates to a number of samples at the first time, and the weight value corresponding to the second information relates to a number of samples at the second time,
wherein the delta pixel information is generated to include one or more portions of the pixel information of the second information that are updated since the first information was obtained, or a nonzero difference between the weight value corresponding to the first information and the weight value corresponding to the second information, and
wherein the delta pixel information is generated to exclude one or more portions of the pixel information of the second information that are unchanged since the first information was obtained; and
transmitting the delta pixel information to a front-end client to enable reconstruction of the second information of the computer image at the front-end client.

13. The machine-readable non-transitory medium of claim 12, wherein the delta pixel information is generated without using a form of lossy data compression.

14. The machine-readable non-transitory medium of claim 12, wherein:
the computer image is formed by a plurality of tiles;
the one or more portions of the pixel information of the second information that are updated corresponds to at least a first tile of the plurality of tiles, the first tile including at least one pixel that is updated since the first information was obtained; and
the one or more portions of the pixel information of the second information that are unchanged corresponds to at least a second tile of the plurality of tiles, the second tile not including at least one pixel that is updated since the first information was obtained.

15. The machine-readable non-transitory medium of claim 14, wherein transmitting the delta pixel information comprises transmitting an identifier of the first tile that identifies a position of the first tile in the computer image.

16. The machine-readable non-transitory medium of claim 15, wherein transmitting the delta pixel information further comprises transmitting information indicating a position, in the first tile, of the at least one pixel that is updated since the first information was obtained.

17. The machine-readable non-transitory medium of claim 15, wherein transmitting the delta pixel information further comprises transmitting the delta pixel information in a sequential order based on the information indicating the position, in the first tile, of the at least one pixel.

18. The machine-readable non-transitory medium of claim 12, wherein the one or more portions of the pixel information of the second information that are updated since the first information was obtained include at least primary color information or alpha information, and further include arbitrary output value (AOV) information other than the primary color information and the alpha information.

19. The machine-readable non-transitory medium of claim 18, wherein the instructions further comprise:
storing a first sampling weight value corresponding to at least the primary color information or the alpha information; and
storing a second sampling weight value corresponding to the AOV information other than the primary color information and the alpha information.

20. The machine-readable non-transitory medium of claim 19, wherein the first sampling weight value is different from the second sampling weight value.

21. A system for facilitating an interactive rendering of a computer image at a remote computer, the system comprising one or more controllers configured to:
at a first time, obtain first information of the computer image, the first information comprising pixel information of the computer image at the first time;
at a second time after the first time, obtain second information of the computer image, the second information comprising pixel information of the computer image at the second time;
generate delta pixel information by comparing the pixel information of the first information with the pixel information of the second information, and comparing a weight value corresponding to the first information with a weight value corresponding to the second information,
wherein the weight value corresponding to the first information relates to a number of samples at the first time, and the weight value corresponding to the second information relates to a number of samples at the second time,
wherein the delta pixel information is generated to include one or more portions of the pixel information of the second information that are updated since the first information was obtained, or a nonzero difference between the weight value corresponding to the first information and the weight value corresponding to the second information, and
wherein the delta pixel information is generated to exclude one or more portions of the pixel information of the second information that are unchanged since the first information was obtained; and
transmit the delta pixel information to a front-end client to enable reconstruction of the second information of the computer image at the front-end client.

22. A method of facilitating an interactive rendering of a computer image at a front-end computer, the method comprising:
retrieving first information of the computer image, the first information comprising pixel information of the computer image at a first time;

receiving delta pixel information, wherein the delta pixel information includes one or more portions of pixel information of second information of the computer image at a second time after the first time, the one or more portions of the second information being updated relative to the first information, or includes a nonzero difference between a weight value corresponding to the first information and a weight value corresponding to the second information, wherein the weight value corresponding to the first information relates to a number of samples at the first time, and the weight value corresponding to the second information relates to a number of samples at the second time, and wherein the delta pixel information excludes one or more portions of the pixel information of the second information that are unchanged relative to the first information; and reconstructing the second information by updating the retrieved first information based on the received delta pixel information.

\* \* \* \* \*